(12) United States Patent
Richardson (10) Patent No.: US 8,566,960 B2
(45) Date of Patent: Oct. 22, 2013

(54) SYSTEM AND METHOD FOR ADJUSTABLE LICENSING OF DIGITAL PRODUCTS

(75) Inventor: Ric B. Richardson, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 466 days.

(21) Appl. No.: 12/272,570

(22) Filed: Nov. 17, 2008

(65) Prior Publication Data

US 2009/0138975 A1 May 28, 2009

Related U.S. Application Data

(60) Provisional application No. 60/988,778, filed on Nov. 17, 2007.

(51) Int. Cl.
*G06F 21/00* (2013.01)
(52) U.S. Cl.
USPC .......... 726/32; 726/27; 726/28; 726/29; 726/33; 713/165; 713/166; 713/167; 380/201; 380/227
(58) Field of Classification Search
USPC ........ 726/27, 28, 29, 30, 31, 32, 33; 713/165, 713/166, 167; 705/57, 58, 59; 380/201, 380/227, 230–234
See application file for complete search history.

(56) References Cited

U.S. PATENT DOCUMENTS

| | | |
|---|---|---|
| 4,278,837 A | 7/1981 | Best |
| 4,351,982 A | 9/1982 | Miller et al. |
| 4,446,519 A | 5/1984 | Thomas |
| 4,458,315 A | 7/1984 | Uchenick |
| 4,471,163 A | 9/1984 | Donald et al. |
| 4,484,217 A | 11/1984 | Block et al. |
| 4,593,353 A | 6/1986 | Pickholtz |
| 4,593,376 A | 6/1986 | Volk |
| 4,599,489 A | 7/1986 | Cargile |
| 4,609,777 A | 9/1986 | Cargile |
| 4,646,234 A | 2/1987 | Tolman et al. |
| 4,654,799 A | 3/1987 | Ogaki et al. |
| 4,658,093 A | 4/1987 | Hellman |
| 4,683,553 A | 7/1987 | Mollier |

(Continued)

FOREIGN PATENT DOCUMENTS

| | | |
|---|---|---|
| AU | 678985 | 6/1997 |
| DE | 101 55 755 A1 | 5/2003 |

(Continued)

OTHER PUBLICATIONS

"Technical Details on Microsoft Product Activation for Windows XP," Internet Citation, XP002398930, Aug. 13, 2001.

(Continued)

*Primary Examiner* — Kambiz Zand
*Assistant Examiner* — Ali Shayanfar
(74) *Attorney, Agent, or Firm* — Sean D. Burdick (57) ABSTRACT

Techniques are provided for adjusting the number of devices allowed to use a digital product (e.g., software) under a license. In one embodiment, the technique may involve setting the allowed number of devices to a first upper/lower limit for a first time period, and, after the first time period has expired, increasing/lowering the allowed number of devices to a second upper/lower limit for a second time period. The technique may involve, readjusting the allowed number for a third time period, thereby allowing for a changing number of device installations of the digital product.

25 Claims, 5 Drawing Sheets

(56) References Cited

U.S. PATENT DOCUMENTS

| | | |
|---|---|---|
| 4,685,055 A | 8/1987 | Thomas |
| 4,688,169 A | 8/1987 | Joshi |
| 4,704,610 A | 11/1987 | Smith et al. |
| 4,712,238 A | 12/1987 | Gilhousen et al. |
| 4,740,890 A | 4/1988 | William |
| 4,791,565 A | 12/1988 | Dunham et al. |
| 4,796,220 A | 1/1989 | Wolfe |
| 4,864,494 A | 9/1989 | Kobus, Jr. |
| 4,888,798 A | 12/1989 | Earnest |
| 4,903,296 A | 2/1990 | Chandra et al. |
| 4,924,378 A | 5/1990 | Hershey et al. |
| 4,937,863 A | 6/1990 | Robert et al. |
| 4,959,861 A | 9/1990 | Howlette |
| 4,982,430 A | 1/1991 | Frezza et al. |
| 4,999,806 A | 3/1991 | Chernow et al. |
| 5,014,234 A | 5/1991 | Edwards, Jr. |
| 5,033,084 A | 7/1991 | Beecher |
| 5,034,980 A | 7/1991 | Kubota |
| 5,081,676 A | 1/1992 | Chou et al. |
| 5,083,309 A | 1/1992 | Beysson |
| 5,103,476 A | 4/1992 | Waite et al. |
| 5,109,413 A | 4/1992 | Comerford et al. |
| 5,113,518 A | 5/1992 | Durst et al. |
| 5,146,575 A | 9/1992 | Nolan, Jr. |
| 5,199,066 A | 3/1993 | Logan |
| 5,210,795 A | 5/1993 | Lipner et al. |
| 5,222,133 A | 6/1993 | Chou et al. |
| 5,222,134 A | 6/1993 | Waite et al. |
| 5,259,029 A | 11/1993 | Duncan, Jr. |
| 5,260,999 A | 11/1993 | Wyman |
| 5,287,408 A | 2/1994 | Samson |
| 5,291,598 A | 3/1994 | Grundy |
| 5,319,705 A | 6/1994 | Halter et al. |
| 5,337,357 A | 8/1994 | Chou et al. |
| 5,341,429 A | 8/1994 | Stringer et al. |
| 5,343,526 A | 8/1994 | Lassers |
| 5,375,240 A | 12/1994 | Grundy |
| 5,390,297 A | 2/1995 | Barber et al. |
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,495,411 A | 2/1996 | Ananda |
| 5,509,070 A | 4/1996 | Schull |
| 5,548,645 A | 8/1996 | Ananda |
| 5,559,884 A | 9/1996 | Davidson et al. |
| 5,579,222 A | 11/1996 | Bains et al. |
| 5,666,415 A | 9/1997 | Kaufman |
| 5,703,951 A | 12/1997 | Dolphin |
| 5,745,879 A | 4/1998 | Wyman |
| 5,754,763 A | 5/1998 | Bereiter |
| 5,754,864 A | 5/1998 | Hill |
| 5,790,664 A | 8/1998 | Coley et al. |
| 5,835,911 A | 11/1998 | Nakagawa et al. |
| 5,893,910 A | 4/1999 | Martineau et al. |
| 5,925,127 A * | 7/1999 | Ahmad .......................... 726/31 |
| 5,940,504 A | 8/1999 | Griswold |
| 5,956,505 A | 9/1999 | Manduley |
| 5,974,150 A | 10/1999 | Kaish et al. |
| 6,006,190 A | 12/1999 | Baena-Arnaiz et al. |
| 6,009,401 A | 12/1999 | Horstmann |
| 6,029,141 A | 2/2000 | Bezos et al. |
| 6,044,471 A | 3/2000 | Colvin |
| 6,049,789 A | 4/2000 | Frison et al. |
| 6,070,171 A | 5/2000 | Snyder et al. |
| 6,101,606 A | 8/2000 | Diersch et al. |
| 6,134,659 A | 10/2000 | Sprong et al. |
| 6,158,005 A | 12/2000 | Bharathan et al. |
| 6,169,976 B1 | 1/2001 | Colosso |
| 6,189,146 B1 | 2/2001 | Misra et al. |
| 6,226,747 B1 | 5/2001 | Larsson et al. |
| 6,230,199 B1 | 5/2001 | Revashetti et al. |
| 6,233,567 B1 | 5/2001 | Cohen |
| 6,236,971 B1 | 5/2001 | Stefik et al. |
| 6,243,468 B1 | 6/2001 | Pearce et al. |
| 6,294,793 B1 | 9/2001 | Brunfeld et al. |
| 6,327,617 B1 | 12/2001 | Fawcett |
| 6,330,670 B1 | 12/2001 | England et al. |
| 6,343,280 B2 | 1/2002 | Clark |
| 6,363,486 B1 | 3/2002 | Knapton, III |
| 6,449,645 B1 | 9/2002 | Nash |
| 6,467,088 B1 | 10/2002 | alSafadi et al. |
| 6,536,005 B1 | 3/2003 | Augarten |
| 6,557,105 B1 | 4/2003 | Tardo et al. |
| 6,587,842 B1 | 7/2003 | Watts |
| 6,697,948 B1 | 2/2004 | Rabin et al. |
| 6,785,825 B2 | 8/2004 | Colvin |
| 6,829,596 B1 | 12/2004 | Frazee |
| 6,857,078 B2 | 2/2005 | Colvin |
| 6,859,793 B1 | 2/2005 | Lambiase |
| 6,880,086 B2 | 4/2005 | Kidder et al. |
| 6,920,567 B1 | 7/2005 | Doherty et al. |
| 6,976,009 B2 | 12/2005 | Tadayon et al. |
| 7,020,635 B2 | 3/2006 | Hamilton et al. |
| 7,024,696 B1 | 4/2006 | Bahar |
| 7,032,110 B1 | 4/2006 | Su et al. |
| 7,069,440 B2 | 6/2006 | Aull |
| 7,069,595 B2 | 6/2006 | Cognigni et al. |
| 7,085,741 B2 | 8/2006 | Lao et al. |
| 7,146,645 B1 | 12/2006 | Hellsten et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,228,567 B2 | 6/2007 | Serkowski et al. |
| 7,272,728 B2 | 9/2007 | Pierson et al. |
| 7,313,828 B2 | 12/2007 | Holopainen |
| 7,319,987 B1 | 1/2008 | Hoffman et al. |
| 7,327,280 B2 | 2/2008 | Bachelder et al. |
| 7,328,453 B2 | 2/2008 | Merkle et al. |
| 7,337,147 B2 | 2/2008 | Chen et al. |
| 7,343,297 B2 | 3/2008 | Bergler et al. |
| 7,463,945 B2 | 12/2008 | Kiesel et al. |
| 7,644,442 B2 | 1/2010 | Miller et al. |
| 7,653,899 B1 | 1/2010 | Lindahl et al. |
| 7,676,804 B2 | 3/2010 | Ferguson et al. |
| 7,870,273 B2 | 1/2011 | Watson et al. |
| 7,890,950 B1 | 2/2011 | Nanavati et al. |
| 7,908,662 B2 | 3/2011 | Richardson |
| 7,912,787 B2 | 3/2011 | Sakakihara et al. |
| 8,229,858 B1 | 7/2012 | Mazza et al. |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0069172 A1 | 6/2002 | Omshehe et al. |
| 2002/0082997 A1 | 6/2002 | Kobata et al. |
| 2002/0152395 A1 | 10/2002 | Zhang et al. |
| 2002/0152401 A1 | 10/2002 | Zhang et al. |
| 2002/0161718 A1 | 10/2002 | Coley et al. |
| 2003/0046566 A1 | 3/2003 | Holopainen |
| 2003/0065918 A1 | 4/2003 | Willey |
| 2003/0125975 A1 | 7/2003 | Danz et al. |
| 2003/0172035 A1 | 9/2003 | Cronce et al. |
| 2003/0200541 A1 | 10/2003 | Cheng et al. |
| 2004/0009815 A1 | 1/2004 | Zotto et al. |
| 2004/0024860 A1 | 2/2004 | Sato et al. |
| 2004/0030912 A1 | 2/2004 | Merkle, Jr. et al. |
| 2004/0039916 A1 | 2/2004 | Aldis et al. |
| 2004/0059929 A1 | 3/2004 | Rodgers et al. |
| 2004/0059938 A1 | 3/2004 | Hughes et al. |
| 2004/0066417 A1* | 4/2004 | Anabuki et al. ............... 345/848 |
| 2004/0143746 A1 | 7/2004 | Ligeti et al. |
| 2004/0148525 A1 | 7/2004 | Aida et al. |
| 2004/0152516 A1 | 8/2004 | Blatter et al. |
| 2004/0177354 A1 | 9/2004 | Gunyakti et al. |
| 2004/0187018 A1 | 9/2004 | Owen et al. |
| 2004/0221169 A1 | 11/2004 | Lee et al. |
| 2004/0249763 A1 | 12/2004 | Vardi |
| 2005/0027657 A1 | 2/2005 | Leontiev et al. |
| 2005/0069129 A1 | 3/2005 | Ho et al. |
| 2005/0071280 A1 | 3/2005 | Irwin et al. |
| 2005/0076334 A1 | 4/2005 | Demeyer |
| 2005/0108173 A1 | 5/2005 | Stefik et al. |
| 2005/0138155 A1 | 6/2005 | Lewis |
| 2005/0165693 A1 | 7/2005 | Morritzen et al. |

(56) References Cited

U.S. PATENT DOCUMENTS

| | | |
|---|---|---|
| 2005/0172280 A1 | 8/2005 | Ziegler et al. |
| 2005/0262498 A1 | 11/2005 | Ferguson et al. |
| 2005/0278395 A1 | 12/2005 | Sandaire |
| 2005/0289072 A1 | 12/2005 | Sabharwal |
| 2006/0048236 A1* | 3/2006 | Multerer et al. ............ 726/28 |
| 2006/0064756 A1 | 3/2006 | Ebert |
| 2006/0072444 A1 | 4/2006 | Engel et al. |
| 2006/0095454 A1 | 5/2006 | Shankar et al. |
| 2006/0161914 A1 | 7/2006 | Morrison et al. |
| 2006/0190403 A1 | 8/2006 | Lin et al. |
| 2006/0242081 A1 | 10/2006 | Ivanov et al. |
| 2006/0265337 A1 | 11/2006 | Wesinger, Jr. |
| 2006/0265758 A1 | 11/2006 | Khandelwal et al. |
| 2006/0272031 A1* | 11/2006 | Ache et al. ............ 726/28 |
| 2006/0282511 A1* | 12/2006 | Takano et al. ............ 709/217 |
| 2007/0143228 A1 | 6/2007 | Jorden et al. |
| 2007/0150418 A1 | 6/2007 | Ben-Menahem et al. |
| 2007/0162395 A1 | 7/2007 | Ben-Yaacov et al. |
| 2007/0168288 A1 | 7/2007 | Bozeman |
| 2007/0198422 A1 | 8/2007 | Prahlad et al. |
| 2007/0203846 A1 | 8/2007 | Kavuri et al. |
| 2007/0219917 A1 | 9/2007 | Liu et al. |
| 2007/0282615 A1 | 12/2007 | Hamilton et al. |
| 2007/0300308 A1 | 12/2007 | Mishura |
| 2008/0065552 A1 | 3/2008 | Elazar et al. |
| 2008/0086423 A1 | 4/2008 | Waites |
| 2008/0141378 A1 | 6/2008 | McLean |
| 2008/0147556 A1 | 6/2008 | Smith et al. |
| 2008/0148067 A1 | 6/2008 | Sitrick et al. |
| 2008/0172300 A1 | 7/2008 | Karki et al. |
| 2008/0228578 A1 | 9/2008 | Mashinsky |
| 2008/0244754 A1 | 10/2008 | Curren |
| 2008/0247731 A1 | 10/2008 | Yamauchi et al. |
| 2008/0289050 A1 | 11/2008 | Kawamoto et al. |
| 2008/0320607 A1 | 12/2008 | Richardson |
| 2009/0024984 A1 | 1/2009 | Maeda |
| 2009/0037337 A1 | 2/2009 | Baitalmal et al. |
| 2009/0083730 A1 | 3/2009 | Richardson |
| 2009/0138643 A1 | 5/2009 | Charles et al. |
| 2009/0165080 A1 | 6/2009 | Fahn et al. |
| 2009/0228982 A1 | 9/2009 | Kobayashi et al. |
| 2010/0057703 A1 | 3/2010 | Brandt et al. |
| 2010/0293622 A1 | 11/2010 | Nikitin et al. |
| 2010/0306819 A1 | 12/2010 | Nahari et al. |
| 2013/0007892 A1 | 1/2013 | Inooka |

FOREIGN PATENT DOCUMENTS

| | | |
|---|---|---|
| EP | 1 096 406 | 5/2001 |
| EP | 1 560 098 | 8/2005 |
| EP | 1 637 958 | 3/2006 |
| EP | 1 637 961 | 3/2006 |
| EP | 1 670 188 A2 | 6/2006 |
| JP | 4 369 068 | 12/1992 |
| WO | WO 92/09160 | 5/1992 |
| WO | 9220022 | 11/1992 |
| WO | 9301550 | 1/1993 |
| WO | 9535533 | 12/1995 |
| WO | 98/42098 | 9/1998 |
| WO | 0067095 | 11/2000 |
| WO | WO 00/72119 | 11/2000 |
| WO | 2005/104686 A2 | 11/2005 |
| WO | 2007/060516 A2 | 5/2007 |
| WO | 2008/013504 | 1/2008 |

OTHER PUBLICATIONS

International Search Report and Written Opinion for corresponding International Application No. PCT/US2008/083809 dated Apr. 29, 2009, total 14 pages.

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

Wikipedia: "Software Extension," May 28, 2009, Internet Article retrieved on Oct. 11, 2010. XP002604710.

Williams et al., "Web Database Applications with PHP & MySQL," *O'Reilly Media Chapter 1. Database Applications and the Web* Mar. 2002, Internet Article retrieved on Sep. 21, 2010. XP002603488.

Williams, R., "A Painless Guide to CRC Error Detection Algorithms," Aug. 13, 1993, 33 pages, www.ross.net/crc/download/crc_v3.txt.

Osgood, David, Letter to Rhythms Researcher, Mini-Mitter Co., Inc., after 1990, 2 pgs.

Corcoran et al., "Techniques for Securing Multimedia Content in Consumer Electronic Appliances using Biometrics Signatures," *Transactions on Consumer Electronics*, vol. 51, No. 2, pp. 545-551.

Microsoft Corporation, "Operations Guide: Microsoft Systems Management Server 2003," 2003, Internet Citation retrieved on Jun. 27, 2007. XP 002439673.

Rivest, R. "RFC 1321—The MD5 Message Digest Algorithm," Apr. 1992, Retrieved from the Internet on Jul. 21, 2005.

Ye, Ruopeng, "Authenticated Software Update," *A Dissertation Submitted to the College of Computer and Information Science of Northeaster University in Partial Fulfillment of the Requirements for the Degree of Doctor of Phisosophy in Computer Science*, Apr. 28, 2008.

Wikberg, Michael, "Software License Management from System-Intergrator Viewpoint," Master's Thesis for a Degree for Computer Science and Engineering, School of Science and Technology, Aalto University, Helsinki, Apr. 30, 2010.

\* cited by examiner

Figure 4

SYSTEM AND METHOD FOR ADJUSTABLE LICENSING OF DIGITAL PRODUCTS

CROSS-REFERENCE TO RELATED APPLICATION(S)

This application claims priority pursuant to 35 U.S.C. §119(e) to U.S. Provisional Application No. 60/988,778, entitled "SYSTEM FOR ADJUSTABLE DIGITAL LICENSING OVER TIME," filed Nov. 17, 2007, which application is specifically incorporated herein, in its entirety, by reference.

BACKGROUND OF THE INVENTION

1. Field of the Invention

The present application relates generally to managing software use, and more specifically to systems and methods to enable the monitoring and adjusting software usage under a software license.

2. Description of the Related Art

A common capability of digital product license systems is the ability to control how many devices are allowed to be used with each product license which is usually sold to an individual customer or company. For example U.S. Pat. No. 5,490,216 refers to a system where a license is given to an individual, but in turn that license is linked to a specific personal computer thereby limiting the copyright holders exposure to copyright abuse if the user decided to share their license with other unauthorized users.

A problem that has arisen over time is the fact that consumers of software have normal patterns of use that include the installation and use of digital products on multiple devices. For example a person may wish to buy software and use it on three computers at their home, a computer at work, a mobile computer and the computers at their holiday home and their parent's house. In addition to these uses, computers are also bought, sold and replaced so over time maybe two or three times this number of computers may be used by the user over time with a legitimate need to install and use the software on every computer.

Publishers of digital products have a dilemma in that they may want their customers to receive the normal freedom to use the software that they have purchased but they also do not want the software licenses to be freely shared amongst end users or even in worst case shared anonymously over the Internet resulting in massive piracy and copyright abuse of the product.

To solve this problem some publishers have set a relatively high device to license ratio in their control systems in the hope that customers will not exceed the maximum number of devices per license. An example of this is Apple iTunes which enables customers to play a purchased music file on up to a preset number (e.g., five) of devices (e.g., PCs) per license before being requested to buy an additional license. They have also implemented a system that allows customers to turn off the license rights of individual devices with regard to a specific music file license and therefore free up that device installation so that the music file can be used on one additional device.

While this method does go some way to appeasing the problem of a normal customers usage expectations, it does not take into consideration the normal attrition that occurs with the purchase and upgrade of personal computing devices or the like and places an expectation on the user to go through a number of involved steps to retain their rights to use the software. Accordingly, there is a need for an improved technique for allowing for a changing number of device installations on a per license basis over time.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with adjusting a license for a digital product over time. The license may comprise at least one allowed copy count corresponding to a maximum number of devices authorized for use with the digital product. In one embodiment, a system for adjustable licensing includes: a communication module for receiving a request for authorization to use the digital product from a given device; a processor module in operative communication with the communication module; and a memory module in operative communication with the processor module.

The memory module may include executable code for the processor module to: (a) verify that a license data associated with the digital product is valid based at least in part on a device identity associated with the given device; and (b) in response to the device identity already being on a record, allow the digital product to be used on the given device.

The memory module may further include executable code for the processor module to: (c) in response to the device identity not being on the record, set the allowed copy count to a first upper limit for a first time period; (d) calculate a device count corresponding to total number of devices already authorized for use with the digital product; and (e) when the calculated device count is less than the first upper limit, allow the digital product to be used on the given device.

In related aspects, the processor module may be adapted to: (a) in response to the device identity not being on the record, after the first time period has expired, set the allowed copy count to a second upper limit for a second time period; (b) recalculate the device count; and/or (c) when the recalculated device count is less than the second upper limit, allow the digital product to be used on the given device. For example, the second time period may comprise a defined number of days since the initial authorization. The processor module may be adapted to, in response to the calculated device count equaling the second upper limit, send a warning regarding the allowed copy count to the given device. The processor module may be adapted to, in response to the calculated device count exceeding the second upper limit, deny the request for authorization.

In further related aspects, the processor module may be adapted to: (a) in response to the device identity not being on the record, after the second time period has expired, set the allowed copy count to a third upper limit; (b) recalculate the device count; and (c) when the recalculated device count is less than the third upper limit, allow the digital product to be used on the given device. The processor module may be adapted to, in response to the calculated device count equaling the third upper limit, send a warning regarding the allowed copy count to the given device. The processor module may be adapted to, in response to the calculated device count exceeding the third upper limit, deny the request for authorization.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein allow for a changing number of device installations on a per license basis over time. Aspects of the techniques may include a customer feedback system that warns a user when they are nearing the limit of their device installation ceiling for their license. An example scenario could be as follows. A software publisher wants to commence distribution of a software product and to minimize unauthorized copying of their software. Their license may state that the publisher authorizes the user to use their software on up to, for example, five devices, but that the publisher reserves the right to increase this limit at their own discretion. The customer installs the software on the three computers they have at home. Each time the software connects to a license management server controlled by the publisher over the Internet to ensure that the device limit for the individual license has not been exceeded.

The customer may choose to install the same software on their personal computer (PC) at work. Upon contacting the publishers license management server over the Internet a message is displayed to the user warning them that they are nearing the limit of their device count for their license.

Two weeks later the user wishes to install their software on the two computers they own at the customers holiday home. If the publisher uses the proposed invention the maximum number of devices for the license may have been adjusted to accommodate a reasonable small increase in the number of devices linked to a specific license and both PCs may be allowed to install and run even though the publishers stated device limit per license is five.

Then three months later, the user experiences water damage from a flood in their house and a new PC is purchased. Upon installation of the protected software the invention will allow the user to obtain additional device installations from the publishers license management server for the same license (e.g., up to a total of seven devices) even though the device limit is initially set to five. However, if that user shares their license with all the computer users in a college dormitory, the invention can be set to stop wholesale abuse of the license terms, as described in further detail herein.

Figure 1:
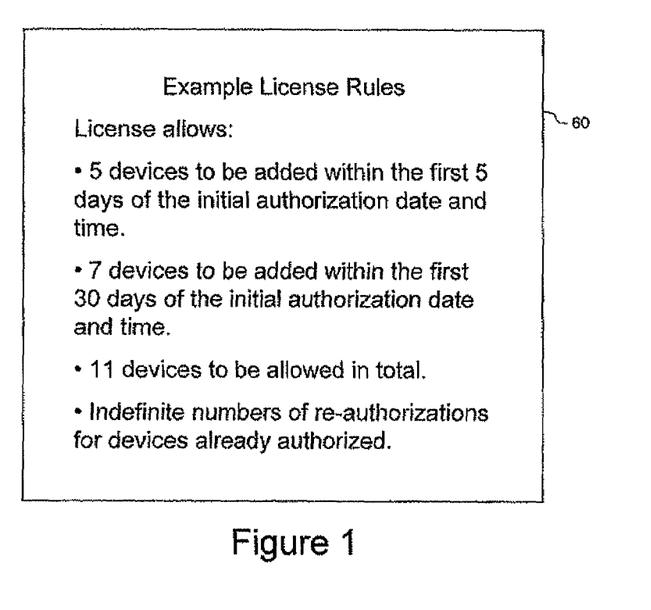
FIG. 1 is an exemplary set of license rules that may be implemented to adjust the number of device installations on a per license basis over time.

In accordance with one or more aspects of the embodiments described herein, there is provided a system for adjustable digital licensing over time allows a software user to increase the number of devices they can use with a particular software license over the period of ownership of that license. The terms or rules 60 of an exemplary software license are shown in FIG. 1. For example, initially, the publisher or distributor of the software sets rules 60 that govern the use of the software on a specific number of devices. The number of devices allowed to run the software in an authorized or enabled state may increase over time to reflect the normal usage pattern of software users where the user adds devices, replaces or upgrades devices over time. The rules 60 may reflect this pattern of an increasing number of devices authorized over time. For the first five days of the users use of the software a total of five devices can be authorized on new devices. For the next twenty-five days until the thirtieth day after first authorization, the user is allowed to authorize a total of seven new devices. After the first thirty days an additional four devices can be authorized, delivering the maximum number of copies on separate devices under the license which, in this example embodiment, is eleven.

It is noted that the various numbers used to describe the embodiments herein, such as, for example, the allowed copy counts, the maximum number of devices authorized for use, the upper limit on the number of devices for a given time period, or the like, are purely exemplary, and that other numbers, data, values, or algorithms may be used in lieu of the exemplary numbers herein.

Figure 2:
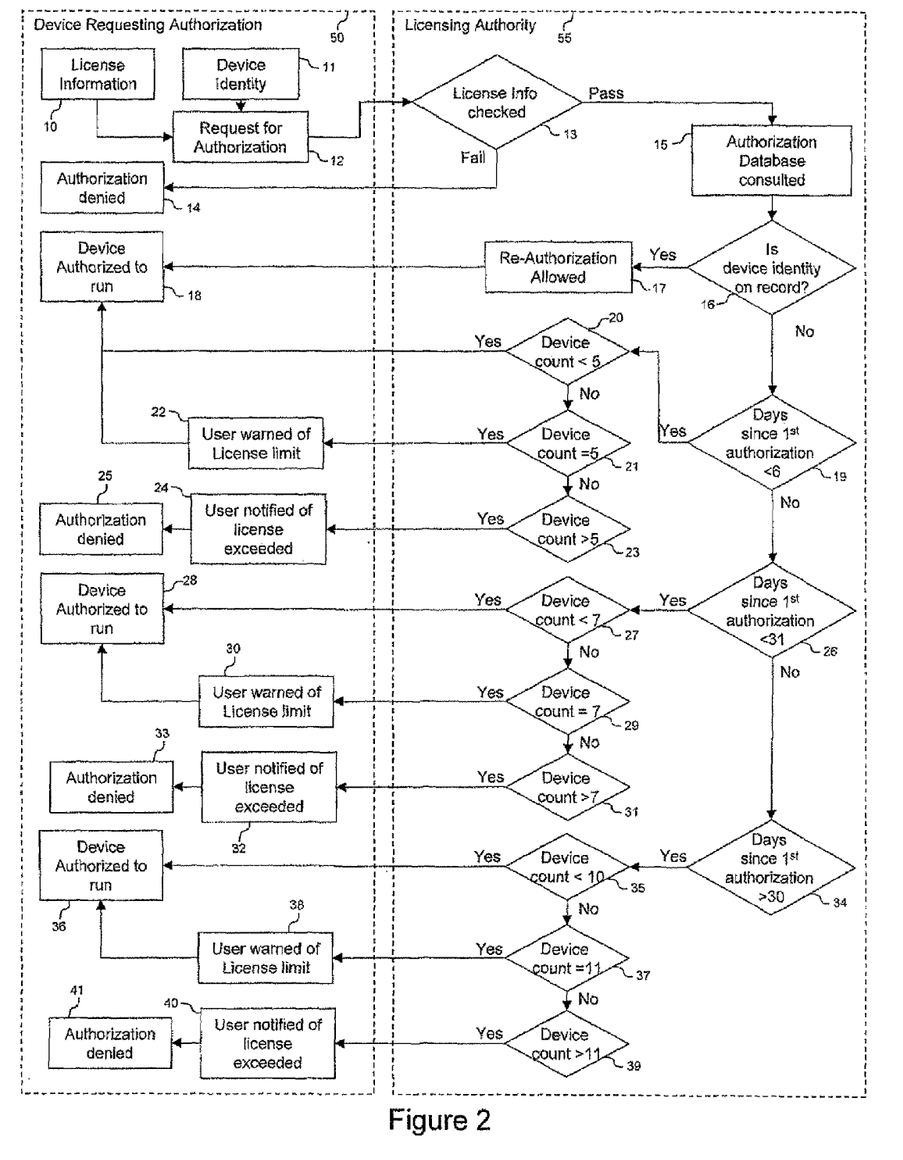
FIG. 2 shows an exemplary approach for adjusting a license for a digital product.

In related aspects, FIG. 2 shows an example embodiment of a software system that is designed to manage and implement the rules under a license, such as, for example, the licensing terms 60 described in FIG. 1. Device locked license systems such as described in U.S. Pat. No. 5,490,216, entitled "SYSTEM FOR SOFTWARE REGISTRATION," which is specifically incorporated herein, in its entirety, by reference, allow a software license to be locked to a license agreement and specific authorized devices. With continued reference to FIG. 2, there is shown a system comprising a device 50 that requests authorization via a software process, and a licensing authority 55 that may be a software system that represents the publisher or distributors interests and regulates the number of devices that can be used with each license.

Typically the device 50 requesting authorization collects license related information 10 and unique device identifying information 11, compiles the collected information into a communication and sends it to the authorization authority 55. Upon receipt of this communication from the device 50, the license authority 55 checks that the license information is valid (step 13). If the request fails, an authorization is disallowed (step 14) and the device based software is sent a message to this effect. In practice this may involve further action by the device based software to notify the user of the failure to authorize and then either terminate the software or allow the software to continue in some form of trial mode or the like.

If the request for authorization 12 includes license information/data that is valid, the license information checking process (at step 13) will pass and the requesting devices unique identity information 11 is checked to see if it exists in the database of prior authorizations 15. If the device identity exists (step 16), meaning that the software has been successfully registered on the same device in the past, then according to the license terms 60 for the software a reauthorization is automatically allowed (step 17). A communication allowing the software to continue in an authorized state is passed to the requesting device software 50 and the software on the device is subsequently authorized (step 18) and allowed to run.

If the unique identity of the device 11 is not in the authorization database 15 of previous device requests, then the licensing authority 55 checks to see if the new authorization request is the first request or is a subsequent request that has occurred in the first five days from the date of the first successful authorization (step 19).

At step 19, if the request is within the first five day period, the authorization database 15 is consulted for a count of how many successful authorizations for new devices have been allowed. Under the license rules 60, if the device count is less than five then a message is sent to the request device that allows the software to continue in an authorized state (step 18). If the device count is equal to five then the licensing authority 55 may send a message to the requesting device 50 allowing the device to run in an authorized state (step 18), but also may optionally inform the user that the limit of the number of devices available to run under this license has been reached and that subsequent requests for authorization may be denied in the short term (step 22).

If the count of devices authorized for use with the specific license 10 is greater than five (step 23), then the licensing authority 55 sends a message denying authorization (step 25) and the user is optionally notified that the limit of devices that can be authorized with their license terms has been exceeded (step 24). In practice, the software on the requesting device 50 may subsequently terminate the software or may allow the software to run in a limited trial mode if this is available.

If the number of days since the first authorization of a device for the license 10 is not less than six (step 19), then the licensing authority tests the time elapsed from the first successful authorization to see if it is less than thirty-one days since the date and time of the first successful authorization (step 26). If this test at step 26 is successful (i.e., if the time elapsed since the first successful authorization is less than thirty-one days), then a test is made to see if the count of successful new device authorizations is less than seven (step 27). If this is so, a communication is made to the requesting device 50 authorizing the device 50 to run the software (step 28). If the new device count is equal to seven (step 29), then the user is warned that their device limit has been reached (step 30) and the device 50 is subsequently authorized to run (step 28).

However, if the new device count is greater than seven (step 31), a communication is made to the requesting device 50 that the authorization is denied (step 33) and optionally the user is notified that their license device count has been exceeded (step 32).

If the number of days since the first successful authorization is greater than thirty days (step 34), the device count for the license 10 is checked in the authorization database 15 and the device count for the license 10 retrieved. If the number of successful new device authorizations is ten or less (step 35), then the device authorization is allowed (step 36). If the device count is equal to eleven (step 37), then the user is optionally warned that they have reached the limit (step 38) and the device 50 is authorized to run (step 36).

However if the device count is greater than eleven (step 39), then a communication is made to the requesting device 50 that the user be optionally notified that the maximum number of allowed devices under terms of the license has been exceeded (step 40) and the authorization is denied (step 41).

The result is a license system that allows consumers of software to load their software on new or replacement devices as they are purchased over time without exposing the publisher to copying abuses that is common amongst software pirates and casual software copiers.

In one alternative embodiment, there is provided a license management system that is linked to a fixed calendar date rather than the date of first successful authorization. This approach can be used for marketing and distribution purposes such as specifying specific periods of high copy counts to encourage word of mouth and user to user sharing but later restricting the device count to encourage people to begin paying for copies that have been intentionally shared.

It is noted that the example embodiment of FIGS. 1 and 2 is simple for the purposes of understanding but can include any number of evaluation periods, not just the five, thirty and unlimited day periods described in the example. Also the number of notification stages can be indefinitely expanded, for example the user could be given a polite message encouraging them to be careful with making copies when they are two copies away from their count limit and a stronger message when it is their last copy before being denied authorizations. Messages could also optionally tell the user how many days they have to wait before additional device authorizations will be available.

It is further noted that in FIGS. 1 and 2 the allowed copy count increases over time. An alternative embodiment could be used where the allowed copy count decreases over time. This may be useful in a situation, for example, where the publisher supplies their software with a fairly open device count license rule but discovers individual instances of copy abuse and decides to limit the license terms of those specific licenses.

The described system could also be used with authorizations for software that is rented or otherwise allowed to be used for a specific period of time or number of uses rather than indefinitely as in the example embodiment of FIGS. 1 and 2.

Another alternative embodiment of the above scenarios could include an algorithm rather than an arbitrary value in calculating both the time period for the calculation of the device count, and the device count related to that specific measured time period. For example, the algorithm for the available device count could be equal to the number of elapsed days since the first successful activation divided by five in brackets plus five. Using the example algorithm a device count of five would be available from day one, and a device count of eleven at day thirty and so on.

In yet another alternative embodiment, the techniques described herein may be used for security applications where access is granted to data or some other valuable or important item as a result of a successful authorization rather than in the example of FIGS. 1 and 2 where it is a license that is being granted.

In accordance with one or more aspects of the embodiments described herein, there is provided a method for adjusting a license for a digital product over time. The license rules may comprise at least one allowed copy count corresponding to a maximum number of devices authorized for use with the digital product. With reference to the flow chart shown in FIG. 3A, there is provided a method 300 that may involve receiving a request for authorization to use the digital product on a given device (step 310). The method 300 may further involve verifying that a license data associated with the digital product is valid based at least in part on a device identity associated with the given device (step 320).

Figure 3A:
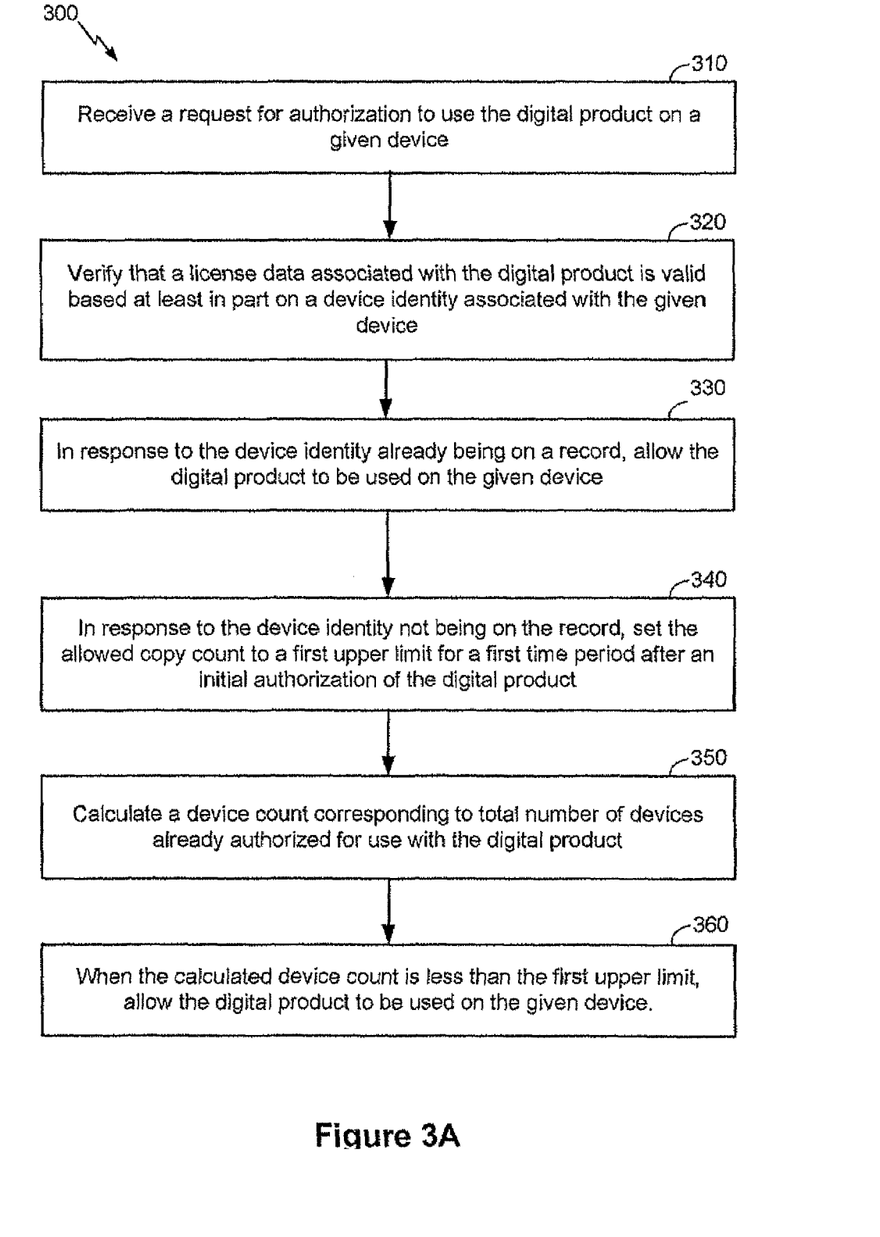
FIG. 3A shows one embodiment for a method for adjusting a license for a digital product.

In response to the device identity already being on a record, the method 300 may involve allowing the digital product to be used on the given device (step 330). In response to the device identity not being on the record, the method 300 may involve setting the allowed copy count to a first upper limit for a first time period after an initial authorization of the digital product (step 340). The method 300 may further involve calculating a device count corresponding to total number of devices already authorized for use with the digital product (step 350), and when the calculated device count is less than the first upper limit, allowing the digital product to be used on the given device (step 360).

Figure 3B:
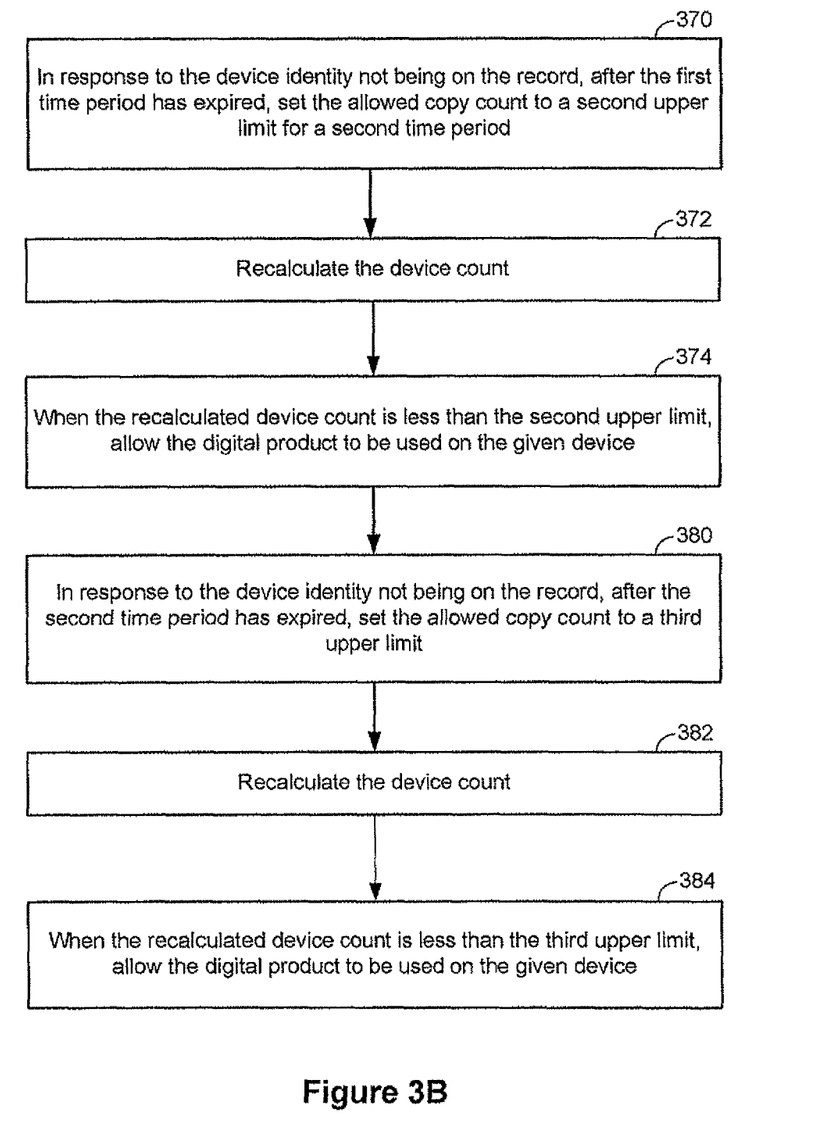
FIG. 3B shows several sample aspects of the method shown in FIG. 3A.

With reference to FIG. 3B, in one embodiment, the method 300 may also involve, in response to the device identity not being on the record, after the first time period has expired, setting the allowed copy count to a second upper limit for a second time period (step 370). The method 300 may further involve recalculating the device count (step 372), and when the recalculated device count is less than the second upper limit, allowing the digital product to be used on the given device (step 374).

With continued reference to FIG. 3B, at step 380, the method 300 may also involve, in response to the device identity not being on the record, after the second time period has expired, setting the allowed copy count to a third upper limit. The method 300 may further involve recalculating the device count (step 382), and when the recalculated device count is less than the third upper limit, allowing the digital product to be used on the given device (step 384).

In accordance with one or more aspects of the embodiments described herein, there is provided a system for adjusting a license for a digital product over time. For example, the license rules may comprise at least one allowed copy count corresponding to a maximum number of devices authorized for use with the digital product. With reference to the flow chart shown in FIG. 4, there is provided a system 400 that may include: a communication module 410 for receiving a request for authorization to use the digital product from a given device; a processor module 420 in operative communication with the communication module; and a memory module 430 in operative communication with the processor module.

Figure 4:
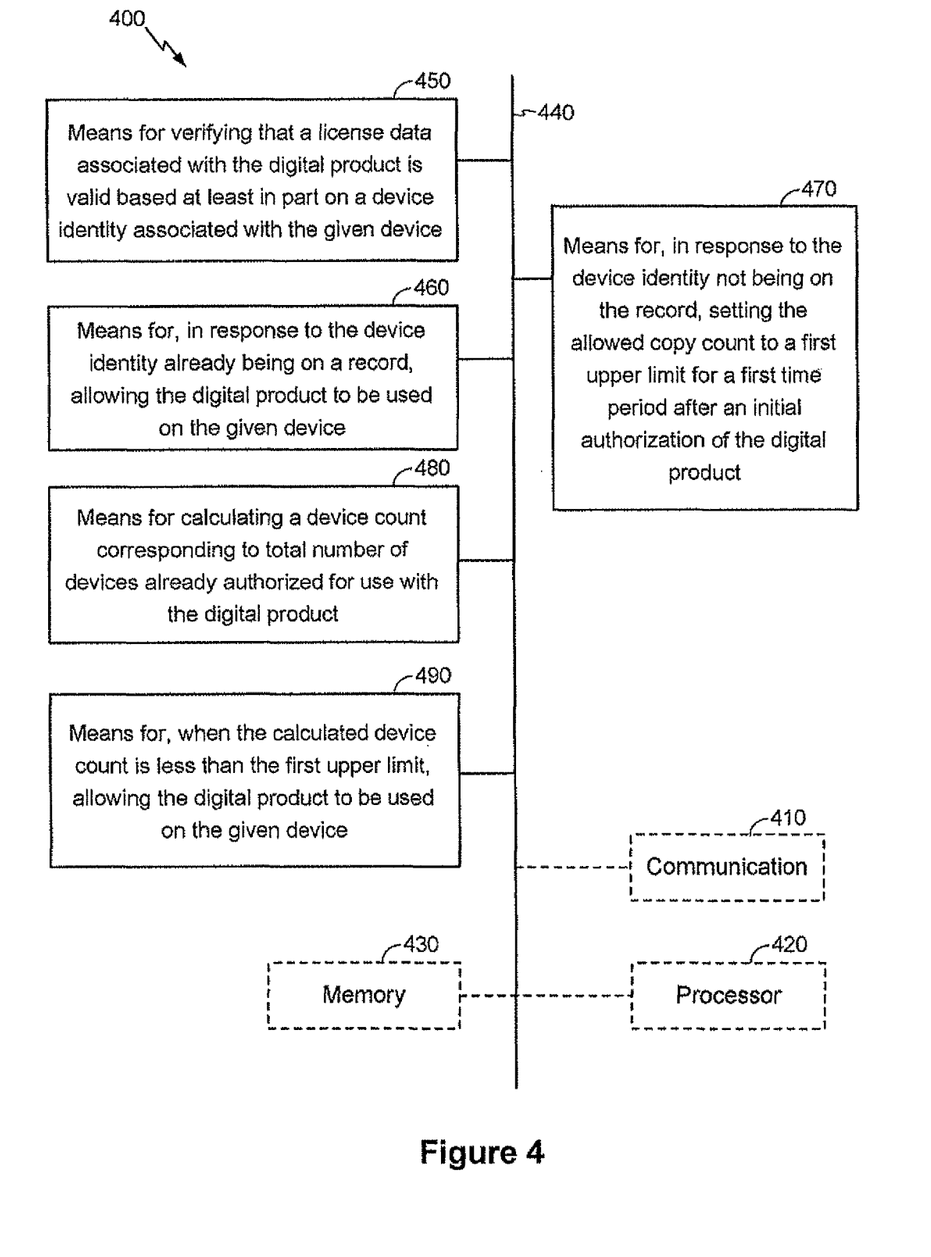
FIG. 4 shows one embodiment for a system for adjusting a license for a digital product.

The memory module 430 may include executable code for the processor module to: (a) verify that a license data associated with the digital product is valid based at least in part on a device identity associated with the given device; and (b) in response to the device identity already being on a record, allow the digital product to be used on the given device. The memory module 430 may further include executable code for the processor module to: (c) in response to the device identity not being on the record, set the allowed copy count to a first upper limit for a first time period (e.g., a time period after an initial authorization of the digital product); (d) calculate a device count corresponding to total number of devices already authorized for use with the digital product; and (e) when the calculated device count is less than the first upper limit, allow the digital product to be used on the given device. While the various steps or tasks described herein, e.g., steps (a) through (e) above, sometimes involve having executable code stored in the memory module 430, it is noted that the processor module 420 may otherwise be adapted to perform such steps/tasks.

In related aspects, the digital product may comprise software, and/or the given device may comprise a PC or the like. The license data may comprises information that may be used to verify whether the license for the digital product is valid. The record may comprise an authorization database. In further related aspects, the first time period may comprises a defined number of days since the initial authorization. For example, the defined number of days may comprise six days since the initial authorization, and the first upper limit may comprise five authorized devices. In yet further related aspects, the processor module 420 may comprise one or more processor, and may be adapted to, in response to the calculated device count equaling the first upper limit, send a warning regarding the allowed copy count to the given device. The processor module 420 may be adapted to, in response to the calculated device count exceeding the first upper limit, deny the request for authorization.

In further related aspects, the processor module 420 also be adapted to: (a) in response to the device identity not being on the record, after the first time period has expired, set the allowed copy count to a second upper limit for a second time period; (b) recalculate the device count; and/or (c) when the recalculated device count is less than the second upper limit, allow the digital product to be used on the given device. The second time period may comprise a defined number of days since the initial authorization. For example, the defined number of days may comprise thirty-one days since the initial authorization, and the second upper limit may comprise seven authorized devices. The processor module 420 may be adapted to, in response to the calculated device count equaling the second upper limit, send a warning regarding the allowed copy count to the given device. The processor module 420 may be adapted to, in response to the calculated device count exceeding the second upper limit, deny the request for authorization.

In yet further related aspects, the processor module 420 also be adapted to: (a) in response to the device identity not being on the record, after the second time period has expired, set the allowed copy count to a third upper limit; (b) recalculate the device count; and (c) when the recalculated device count is less than the third upper limit, allow the digital product to be used on the given device. The third upper limit comprises eleven authorized devices. The processor module 420 may be adapted to, in response to the calculated device count equaling the third upper limit, send a warning regarding the allowed copy count to the given device. The processor module 420 may be adapted to, in response to the calculated device count exceeding the third upper limit, deny the request for authorization.

It is noted that the system 400 may optionally include: a means 450 for verifying that a license data associated with the digital product is valid based at least in part on a device identity associated with the given device; a means 460 for, in response to the device identity already being on a record, allowing the digital product to be used on the given device; a means 470 for, in response to the device identity not being on the record, setting the allowed copy count to a first upper limit for a first time period (e.g. a time period after an initial authorization of the digital product); a means 480 for calculating a device count corresponding to total number of devices already authorized for use with the digital product; and/or a means 490 for, when the calculated device count is less than the first upper limit, allowing the digital product to be used on the given device.

It is also noted that the system 400 may optionally include: a means for, in response to the device identity not being on the record, after the first time period has expired, setting the allowed copy count to a second upper limit for a second time period; a means for recalculating the device count; and/or a means for, when the recalculated device count is less than the second upper limit, allowing the digital product to be used on the given device. It is further noted that the system 400 may optionally include: a means for, in response to the device identity not being on the record, after the second time period has expired, setting the allowed copy count to a third upper limit; a means for recalculating the device count; and/or a means for, when the recalculated device count is less than the third upper limit, allowing the digital product to be used on the given device. The at least one processor of processor module 420, in such case, may be in operative communication with the means 450, 460, 470, 480, and 490 via a bus 440 or similar communication coupling. The processor module 420 may effect initiation and scheduling of the processes or functions performed by the means 450, 460, 470, 480, and 490, and any components thereof.

In still further related aspects, the device identity may comprise unique device identifying information, wherein the unique device identifying information may comprise at least one user-configurable parameter and/or at least one non-user-configurable parameter of the given device. The device identity may be generated by utilizing at least one irreversible transformation of the at least one user-configurable and the at least one non-user-configurable parameters of the given device. The device identity may be generated by utilizing a cryptographic hash function on the at least one user-configurable and the at least one non-user-configurable parameters of the given device.

It is noted that generating the device identity may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identity may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identity values during transmission and comparisons. Such encryption processes may be used in conjunction with random sampling and key generations.

The device identity may be generated by utilizing machine or device parameters associated with one or more of the following: machine model; machine serial number; machine copyright; machine ROM version; machine bus speed; machine details; machine manufacturer; machine ROM release date; machine ROM size; machine UUID; and machine service tag.

The device identity may also be generated by utilizing machine parameters associated with one or more of the following: CPU ID; CPU model; CPU details; CPU actual speed; CPU family; CPU manufacturer; CPU voltage; and CPU external clock.

The device identity may also be generated by utilizing machine parameters associated with one or more of the following: memory model; memory slots; memory total; and memory details.

The device identity may also be generated by utilizing machine parameters associated with one or more of the following: video model; video details; display model; display details; audio model; and audio details.

The device identity may also be generated by utilizing machine parameters associated with one or more of the following: network model; network address; Bluetooth address; Blackbox model (including IDE and SCSI); Blackbox serial; Blackbox details; Blackbox damage map; Blackbox volume name; NetStore details; and NetStore volume name.

The device identity may also be generated by utilizing machine parameters associated with one or more of the following: optical model; optical serial; optical details; keyboard model; keyboard details; mouse model; mouse details; printer details; and scanner details.

The device identity may also be generated by utilizing machine parameters associated with one or more of the following: baseboard manufacturer; baseboard product name; baseboard version; baseboard serial number; and baseboard asset tag.

The device identity may also be generated by utilizing machine parameters associated with one or more of the following: chassis manufacturer; chassis type; chassis version; and chassis serial number.

The device identity may also be generated by utilizing machine parameters associated with one or more of the following: IDE controller; SATA controller; RAID controller; and SCSI controller.

The device identity may also be generated by utilizing machine parameters associated with one or more of the following: port connector designator; port connector type; port connector port type; and system slot type.

The device identity may also be generated by utilizing machine parameters associated with one or more of the following: cache level; cache size; cache max size; cache SRAM type; and cache error correction type.

The device identity may also be generated by utilizing machine parameters associated with one or more of the following: fan; PCMCIA; modem; portable battery; tape drive; USB controller; and USB hub.

The device identity may also be generated by utilizing machine parameters associated with one or more of the following: device model; device model IMEI; device model IMSI; and device model LCD.

The device identity may also be generated by utilizing machine parameters associated with one or more of the following: wireless 802.11; webcam; game controller; silicone serial; and PCI controller.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure The accompanying method claims present elements of the various steps in sample order, and are not meant to be limited to the specific order or hierarchy presented.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention

What is claimed is:

1. A system for adjusting a license for a digital product over time, the license comprising at least one allowed copy count corresponding to a maximum number of devices authorized for use with the digital product, comprising:
   a communication module for receiving a request for authorization to use the digital product from a given device;
   a processor module in operative communication with the communication module;
   a memory module in operative communication with the processor module and comprising executable code for the processor module to:
   verify that a license data associated with the digital product is valid based at least in part on a device identity generated by sampling physical parameters of the given device;
   in response to the device identity already being on a record, allow the digital product to be used on the given device;
   in response to the device identity not being on the record, set the allowed copy count to a first upper limit for a first time period, the allowed copy count corresponding to a maximum number of devices authorized to use the digital product;
   calculate a device count corresponding to total number of devices already authorized for use with the digital product; and
   when the calculated device count is less than the first upper limit, allow the digital product to be used on the given device.

2. The system of claim 1, wherein the digital product comprises software.

3. The system of claim 1, wherein the license data comprises information that may be used to verify whether the license for the digital product is valid.

4. The system of claim 1, wherein the record comprises an authorization database.

5. The system of claim 1, wherein the first time period comprises a defined number of days after an initial authorization of the digital product.

6. The system of claim 5, wherein the defined number of days comprises six days since the initial authorization, and wherein the first upper limit comprises five authorized devices.

7. The system of claim 1, wherein the processor module is adapted to, in response to the calculated device count equaling the first upper limit, send a warning regarding the allowed copy count to the given device.

8. The system of claim 1, wherein the processor module is adapted to, in response to the calculated device count exceeding the first upper limit, deny the request for authorization.

9. The system of claim 1, wherein the processor module is adapted to:
   in response to the device identity not being on the record, after the first time period has expired, set the allowed copy count to a second upper limit for a second time period;
   recalculate the device count; and
   when the recalculated device count is less than the second upper limit, allow the digital product to be used on the given device.

10. The system of claim 9, wherein the second time period comprises a defined number of days since the initial authorization.

11. The system of claim 10, wherein the defined number of days comprises thirty-one days since the initial authorization, and wherein the second upper limit comprises seven authorized devices.

12. The system of claim 9, wherein the processor module is adapted to, in response to the calculated device count equaling the second upper limit, send a warning regarding the allowed copy count to the given device.

13. The system of claim 9, wherein the processor module is adapted to, in response to the calculated device count exceeding the second upper limit, deny the request for authorization.

14. The system of claim 9, wherein the processor module is adapted to:

in response to the device identity not being on the record, after the second time period has expired, set the allowed copy count to a third upper limit;

recalculate the device count; and when the recalculated device count is less than the third upper limit, allow the digital product to be used on the given device.

15. The system of claim 14, wherein the third upper limit comprises eleven authorized devices.

16. The system of claim 14, wherein the processor module is adapted to, in response to the calculated device count equaling the third upper limit, send a warning regarding the allowed copy count to the given device.

17. The system of claim 14, wherein the processor module is adapted to, in response to the calculated device count exceeding the third upper limit, deny the request for authorization.

18. The system of claim 1, wherein the device identity comprises unique device identifying information.

19. The system of claim 18, wherein the unique device identifying information comprises at least one user-configurable parameter and at least one non-user-configurable parameter of the given device.

20. The system of claim 18, wherein the device identity is generated by utilizing at least one irreversible transformation of the at least one user-configurable and the at least one non-user-configurable parameters of the given device.

21. The system of claim 18, wherein the device identity is generated by utilizing a cryptographic hash function on the at least one user-configurable and the at least one non-user-configurable parameters of the given device.

22. A method for adjusting a license for a digital product over time, the license comprising at least one allowed copy count corresponding to a maximum number of devices authorized for use with the digital product, comprising:

receiving a request for authorization to use the digital product on a given device;

verifying that a license data associated with the digital product is valid based at least in part on a device identity generated by sampling physical parameters of the given device;

in response to the device identity already being on a record, allowing the digital product to be used on the given device;

in response to the device identity not being on the record, setting the allowed copy count to a first upper limit for a first time period, the allowed copy count corresponding to a maximum number of devices authorized to use the digital product;

calculating a device count corresponding to total number of devices already authorized for use with the digital product; and when the calculated device count is less than the first upper limit, allowing the digital product to be used on the given device.

23. The method of claim 22, further comprising:

in response to the device identity not being on the record, after the first time period has expired, setting the allowed copy count to a second upper limit for a second time period;

recalculating the device count; and when the recalculated device count is less than the second upper limit, allowing the digital product to be used on the given device.

24. The method of claim 23, further comprising:

in response to the device identity not being on the record, after the second time period has expired, setting the allowed copy count to a third upper limit;

recalculating the device count; and when the recalculated device count is less than the third upper limit, allowing the digital product to be used on the given device.

25. A computer program product, comprising:

a non-transitory computer-readable medium comprising:

code for causing a computer to receive a request for authorization to use the digital product;

code for causing a computer to verify that a license data associated with the digital product is valid based at least in part on a device identity generated by sampling physical parameters of the computer;

code for causing a computer to, in response to the device identity already being on a record, allow the digital product to be used on the computer;

code for causing a computer to, in response to the device identity not being on the record, set the allowed copy count to a first upper limit for a first time period after an initial authorization of the digital product, the allowed copy count corresponding to a maximum number of devices authorized to use the digital product;

code for causing a computer to calculate a device count corresponding to total number of devices already authorized for use with the digital product; and code for causing a computer to, when the calculated device count is less than the first upper limit, allowing the digital product to be used on the computer.

* * * * *